UNITED STATES PATENT OFFICE.

ALEXANDER HAMBURGER, OF ELBERFELD, GERMANY, ASSIGNOR TO FARBEN-FABRIKEN VORM. FRIEDR. BAYER & CO., OF ELBERFELD, GERMANY, A CORPORATION OF GERMANY.

VAT DYE.

1,115,188.     Specification of Letters Patent.      Patented Oct. 27, 1914.

No Drawing.      Application filed December 26, 1911. Serial No. 667,630.

*To all whom it may concern:*

Be it known that I, ALEXANDER HAMBURGER, doctor of philosophy, chemist, citizen of the German Empire, residing at Elberfeld, Germany, have invented new and useful Improvements in Vat Dye, of which the following is a specification.

I have found that new and valuable coloring matters dyeing cotton from the alkaline hydrosulfite vat generally from yellow to orange to red shades can be obtained by treating chloroanthraquinone with alkaline sulfids.

The new dyes being thioethers having most probably the formula: R—S—R (R meaning an anthraquinone radical such as, —$C_{14}O_2H_7$, —$C_{14}O_2H_6$—NH.CO$C_6H_5$, etc.) are soluble in concentrated sulfuric acid with generally from a yellow to green coloration.

In order to illustrate my invention, I give the following example, the parts being by weight:—2.75 parts of finely powdered sodium sulfid (70 per cent. S$Na_2$) are added to a solution of 20 parts of 2–chloro-5-benzoylaminoanthraquinone in 100 parts of anilin, which solution is heated to 130° C. The melt which has to be stirred is kept at this temperature during about 15 hours until a test portion is soluble in concentrated sulfuric acid with a greenish-blue coloration. The anilin is then driven over with steam, the precipitate is filtered off, stirred up with water and dilute hydrochloric acid in order to remove the anilin and then it is washed with hot water.

The 5.5′–dibenzoyldiamino–2.2′–dianthraquinonylthioether having most probably the formula:

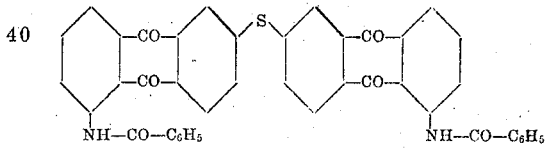

is after being dried and pulverized a yellow powder crystallizing from nitrobenzene in the shape of yellow needles which are soluble in concentrated sulfuric acid with a greenish-blue coloration and dyeing cotton from an alkaline hydrosulfite vat fast yellow shades.

Other chloroanthraquinones may be used such as 1-benzoylamino-5-chloroanthraquinone (orange dye), 1-amino-5-chloroanthraquinone (salmon red dye), 2-chloroanthraquinone (yellow dye), 1-chloroanthraquinone (reddish-yellow dye), 1.5-dichloroanthraquinone (orange dye), 1-amino-2-methly-4-chloroanthraquinone (red dye).

I claim:—

1. As new products, the dianthraquinonyl sulfids of the general formula R—S—R, wherein "R" and "R" stand for anthraquinonyl residues and "S" for sulfur, being powders which are difficultly soluble in organic solvents, insoluble in dilute alkalis and dilute acids, and yielding, when treated with concentrated sulfuric acid, solutions of a characteristic color.

2. The herein described new vat dye being the 5.5′-dibenzoylamino-2.2′-dianthraquinonylthioether having most probably the formula:

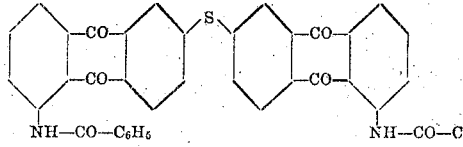

which is after being dried and pulverized a yellow powder crystallizing from nitrobenzene in the shape of yellow needles which are soluble in concentrated sulfuric acid with a greenish-blue coloration; and dyeing cotton from an alkaline hydrosulfite vat yellow fast shades, substantially as described.

3. As new products the 6-6-dianthraquinonyl sulfids of the general formula R—S—R, wherein "R" and "R" stand for the anthraquinonyl residues and "S" for sulfur, being powders which are difficultly soluble in organic solvents, insoluble in dilute alkalis and dilute acids, and yielding, when treated with concentrated sulfuric acid, solutions of a characteristic color.

4. As a new process, the manufacture of the dianthraquinonyl sulfids of the general formula R—S—R, wherein "R" and "R" stand for anthraquinonyl residues and "S" for sulfur, by treating about two molecules of halogen-anthraquinone with about one molecule of alkali metal sulfid.

In testimony whereof I have hereunto set my hand in the presence of two subscribing witnesses.

ALEXANDER HAMBURGER. [L. S.]

Witnesses:
HELEN NUFER,
A. NUFER.

Copies of this patent may be obtained for five cents each, by addressing the "Commissioner of Patents, Washington, D. C."